United States Patent
Shimokawa et al.

(10) Patent No.: US 12,323,000 B2
(45) Date of Patent: Jun. 3, 2025

(54) ELECTRIC MOTOR, FAN, AND AIR CONDITIONER

(71) Applicant: Mitsubishi Electric Corporation, Tokyo (JP)

(72) Inventors: Takaya Shimokawa, Tokyo (JP); Takanori Watanabe, Tokyo (JP); Kazuchika Tsuchida, Tokyo (JP); Ryogo Takahashi, Tokyo (JP); Naoki Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 322 days.

(21) Appl. No.: 18/042,877

(22) PCT Filed: Oct. 30, 2020

(86) PCT No.: PCT/JP2020/040788
§ 371 (c)(1),
(2) Date: Feb. 24, 2023

(87) PCT Pub. No.: WO2022/091332
PCT Pub. Date: May 5, 2022

(65) Prior Publication Data
US 2024/0030756 A1    Jan. 25, 2024

(51) Int. Cl.
*H02K 1/14* (2006.01)

(52) U.S. Cl.
CPC ......... *H02K 1/146* (2013.01); *H02K 2213/03* (2013.01)

(58) Field of Classification Search
CPC ........................... H02K 1/146; H02K 2213/03
(Continued)

(56) References Cited

U.S. PATENT DOCUMENTS

| | | | |
|---|---|---|---|
| 6,873,081 B2* | 3/2005 | Arai | H02K 1/165 310/215 |
| 6,984,909 B2* | 1/2006 | Kadoya | H02K 29/03 310/185 |

(Continued)

FOREIGN PATENT DOCUMENTS

| | | |
|---|---|---|
| JP | 2010-130839 A | 6/2010 |
| JP | 6385969 B2 * | 9/2018 |

(Continued)

OTHER PUBLICATIONS

International Search Report of the International Searching Authority mailed Jan. 12, 2021 for the corresponding International application No. PCT/JP2020/040788 (and English translation).

*Primary Examiner* — Alex W Mok
(74) *Attorney, Agent, or Firm* — Posz Law Group, PLC

(57) ABSTRACT

An electric motor includes a rotor having 10×N (N is an integer equal to or larger than 1) magnetic poles and a stator including 9×N teeth. A center tooth includes a first main body and a first tooth end portion. A downstream-side tooth includes a second main body and a second tooth end portion. The electric motor satisfies TCR>TBR, where TCR is a maximum length of the first upstream-side portion in the first upstream-side radial direction of the first tooth end portion and TBR is a maximum length of the second upstream-side portion in the second upstream-side radial direction of the second tooth end portion.

16 Claims, 15 Drawing Sheets

(58) Field of Classification Search
USPC .......................................................... 310/179
See application file for complete search history.

(56) References Cited

U.S. PATENT DOCUMENTS

| | | | |
|---|---|---|---|
| 8,022,589 B2* | 9/2011 | Matsuda | .................. H02K 1/14 |
| | | | 310/216.096 |
| 10,389,217 B2* | 8/2019 | Li | ........................ H02K 1/2706 |
| 2016/0172949 A1 | 6/2016 | Matsuoka et al. | |
| 2018/0041076 A1* | 2/2018 | Matsuoka | .............. H02K 1/146 |
| 2018/0041077 A1 | 2/2018 | Matsuoka | |
| 2019/0214858 A1* | 7/2019 | Oshikiri | .................... A47L 9/00 |

FOREIGN PATENT DOCUMENTS

| | | |
|---|---|---|
| WO | 2015/029256 A1 | 3/2015 |
| WO | 2016/203579 A1 | 12/2016 |

* cited by examiner

ELECTRIC MOTOR, FAN, AND AIR CONDITIONER

CROSS REFERENCE TO RELATED APPLICATION

This application is a U.S. national stage application of PCT/JP2020/040788 filed on Oct. 30, 2020 the contents of which are incorporated herein by reference.

TECHNICAL FIELD

A present disclosure relates to an electric motor.

BACKGROUND ART

In general, an electric motor having ten magnetic poles and nine slots is known. Since the winding factor in this electric motor is large, magnetic flux from a magnet in the electric motor can be used effectively. In this electric motor, however, an exciting force in a radial direction causing a noise is large. For that reason, an electric motor in which the thickness in a radial direction of a center tooth of adjacent three teeth is smaller than the thickness in a radial direction of end portions of the other teeth has been proposed (see, for example, Patent Reference 1).

PRIOR ART REFERENCE

Patent Reference

PATENT REFERENCE 1: International Publication No. WO 2015/029256

SUMMARY OF THE INVENTION

Problem to be Solved by the Invention

With a conventional technique, however, concerning density of magnetic flux flowing into the adjacent three teeth, an imbalance between these teeth occurs. This imbalance causes a noise during a rotation of a rotor.

It is an object of the present disclosure to improve an imbalance of density of magnetic flux flowing into a stator core and reduce a noise during a rotation of rotor.

Means for Solving the Problem

An electric motor according to one aspect of the present disclosure includes:
a rotor having 10×N (N is an integer equal to or larger than 1) magnetic poles; and
a stator including an annular core back, 9×N teeth extending from the annular core back toward the rotor, and three-phase coils wound around the 9×N teeth by concentrated winding, wherein
the three-phase coils are wound around the 9×N teeth so as to form an identical phase, the three-phase coils being wound around three teeth of the 9×N teeth, the three teeth being adjacent in a circumferential direction,
a center tooth located at center of the three teeth around which the three-phase coils forming the identical phase are wound includes:
a first main body extending from the annular core back toward the rotor; and
a first tooth end portion located in an end portion of the center tooth and extending in the circumferential direction,
the first tooth end portion includes:
a first upstream-side portion located on an upstream side in a rotation direction of the rotor; and
a first downstream-side portion located on a downstream side in the rotation direction,
a downstream-side tooth, of the three teeth, located on a downstream side in the rotation direction includes:
a second main body extending from the annular core back toward the rotor; and
a second tooth end portion located in an end portion of the downstream-side tooth and extending in the circumferential direction,
the second tooth end portion includes:
a second upstream-side portion located on an upstream side in the rotation direction; and
a second downstream-side portion located on a downstream side in the rotation direction,
a direction parallel to a first upstream-side line passing through rotation center of the rotor and a boundary between the first main body and the first upstream-side portion in a plane perpendicular to an axial direction is defined as a first upstream-side radial direction,
a direction parallel to a second upstream-side line passing through the rotation center and a boundary between the second main body and the second upstream-side portion in the plane is defined as a second upstream-side radial direction, and
the electric motor satisfies TCR>TBR,
where TCR is a maximum length of the first upstream-side portion in the first upstream-side radial direction in the plane, and TBR is a maximum length of the second upstream-side portion in the second upstream-side radial direction in the plane.

A fan according to another aspect of the present disclosure includes:
a blade; and
the electric motor to drive the blade.

An air conditioner according to another aspect of the present disclosure includes:
an indoor unit; and
an outdoor unit connected to the indoor unit, wherein
the indoor unit, the outdoor unit, or both the indoor unit and the outdoor unit include the electric motor.

Effect of the Invention

According to the present disclosure, an imbalance of density of magnetic flux flowing into the teeth of a stator core can be improved and a noise during a rotation of rotor can be reduced.

MODE FOR CARRYING OUT THE INVENTION

First Embodiment

In an xyz orthogonal coordinate system shown in each drawing, a z-axis direction (z axis) represents a direction parallel to an axis Ax of an electric motor 1, an x-axis direction (x axis) represents a direction orthogonal to the z-axis direction, and a y-axis direction (y axis) represents a direction orthogonal to both the z-axis direction and the x-axis direction. The axis Ax is a rotation center of a rotor 2, that is, a rotation axis of the rotor 2. The direction parallel to the axis Ax will also be referred to as an "axis direction of the rotor 2" or simply an "axis direction." A radial direction refers to a radial direction of the rotor 2 or a stator 3, and is a direction orthogonal to the axis Ax. An xy plane is a plane orthogonal to the axial direction. An arrow D10 represents a circumferential direction about the axis Ax. A circumferential direction of the rotor 2 or the stator 3 will also be simply referred to as a "circumferential direction."

Figure 1:
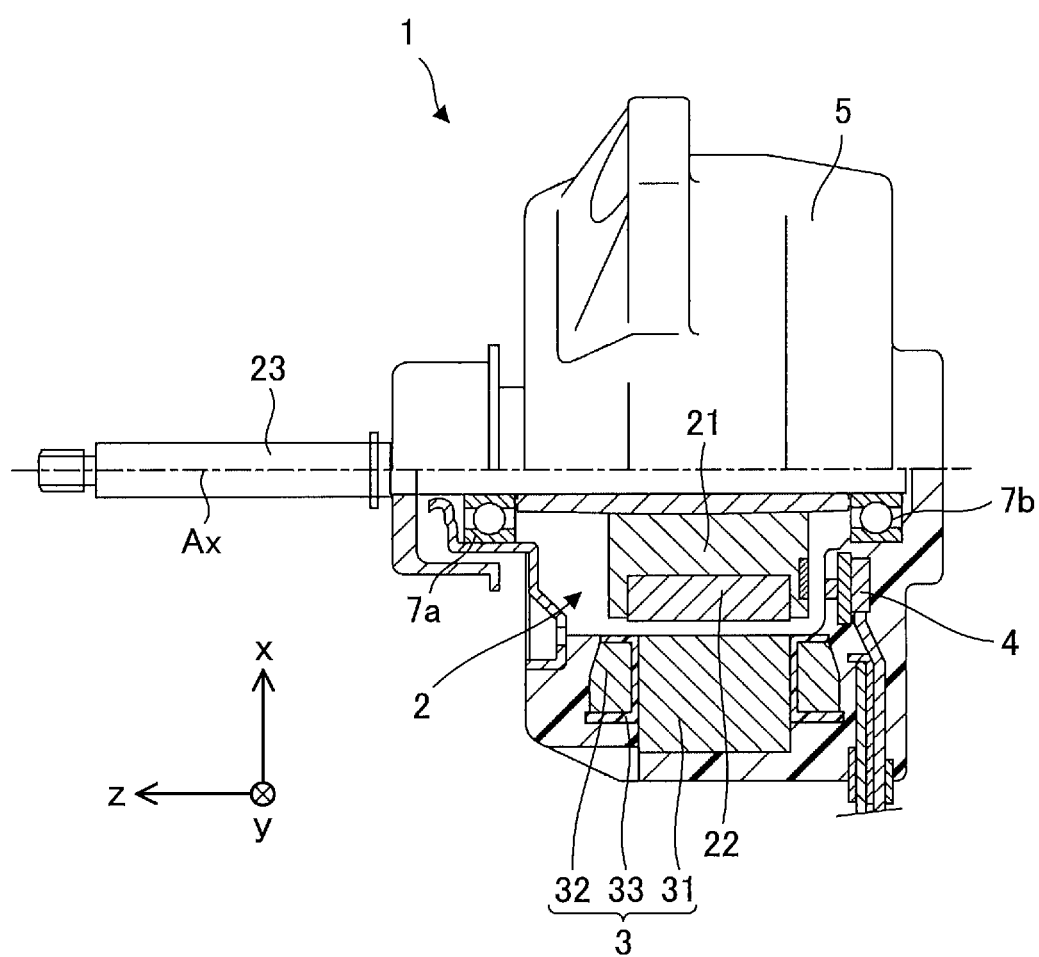
FIG. 1 is a partial cross-sectional view schematically illustrating an electric motor according to a first embodiment.

FIG. 1 is a partial cross-sectional view schematically illustrating the electric motor 1 according to a first embodiment.

Figure 2:
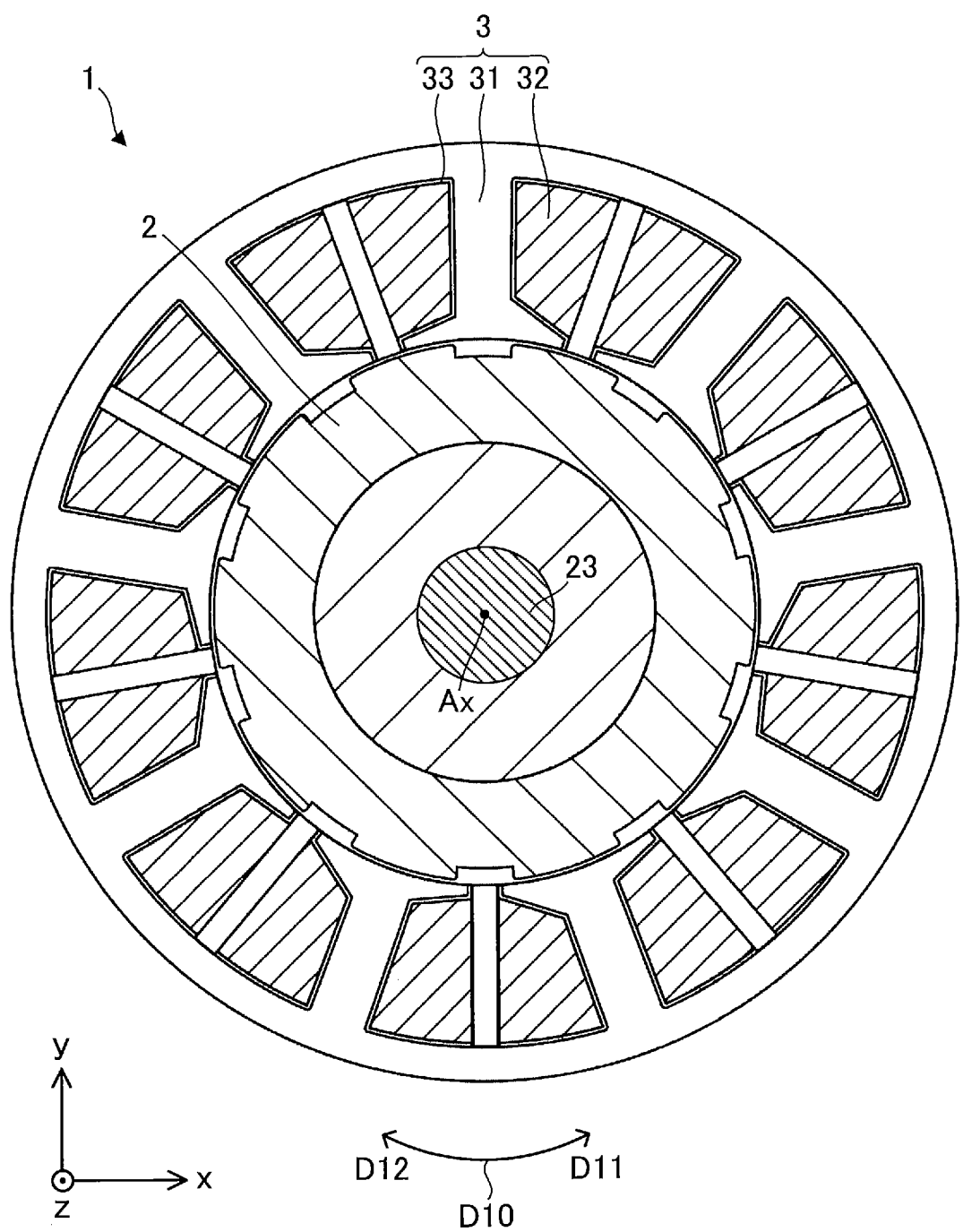
FIG. 2 is a cross-sectional view schematically illustrating the electric motor in an xy plane.

FIG. 2 is a cross-sectional view schematically illustrating the electric motor 1 in an xy plane. An arrow D11 of arrows indicated by D10 represents the rotation direction of the rotor 2. An arrow D12 of arrows indicated by D10 represents the opposite direction of the rotation direction of the rotor 2.

The electric motor 1 includes the rotor 2, the stator 3, a circuit board 4, a molding resin 5, and bearings 7a and 7b rotatably holding the rotor 2. The electric motor 1 is, for example, a permanent magnet synchronous motor such as an interior permanent magnet motor (also referred to as a brushless DC motor).

The bearings 7a and 7b rotatably support the rotor 2.
<Rotor 2>

The rotor 2 is rotatably disposed inside the stator 3. An air gap is present between the rotor 2 and the stator 3. The rotor 2 rotates about the axis Ax.

Figure 3:
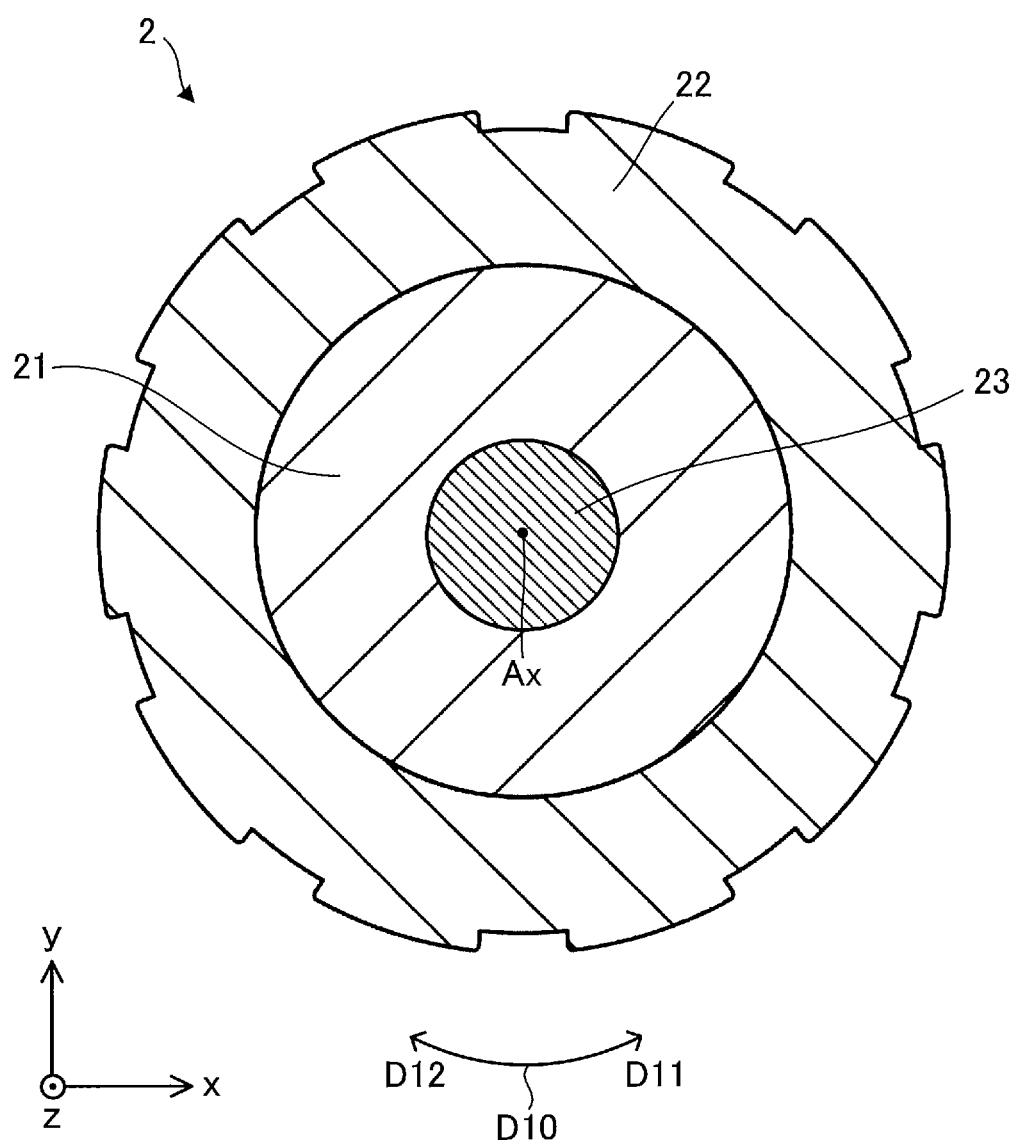
FIG. 3 is a cross-sectional view schematically illustrating a rotor.

FIG. 3 is a cross-sectional view schematically illustrating the rotor 2.

The rotor 2 includes a resin 21, at least one permanent magnet 22 as a main magnet, and a shaft 23.

The permanent magnet 22 is longer than a stator core 31 in the axial direction. With this configuration, it is possible to obtain an advantage that magnetic flux from the rotor 2 is easy to flow into both ends of the stator core in the axial direction.

A rotor core may be used instead of the resin 21. In this case, the rotor core is formed of a plurality of electrical steel sheets. Each of the electrical steel sheets has a thickness of, for example, 0.2 mm to 0.5 mm. The electrical steel sheets are laminated in the axial direction. Note, however, that the rotor core may be a resin core formed by mixing a soft magnetic material and a resin, instead of the plurality of electrical steel sheets. The rotor core functions as a back yoke in the rotor 2.

Each permanent magnet 22 is, for example, a rare earth magnet including neodymium, a rare earth magnet including samarium, or a ferrite magnet including iron.

In an example shown in FIG. 3, the rotor 2 is a surface permanent magnet (SPM) rotor. The plurality of permanent magnets 22 are attached to an outer peripheral surface of the resin 21. Each permanent magnet 22 is magnetized in the radial direction. Accordingly, magnetic flux from the permanent magnet 22 flows into the stator core 31.

The rotor 2 has 10×N (N is an integer equal to or larger than 1) magnetic poles. In the present embodiment, N=1. Therefore, in the example shown in FIG. 3, the rotor 2 has ten magnetic poles. In the example shown in FIG. 3, the rotor 2 includes ten permanent magnet 22.

An interior permanent magnet (IPM) rotor may be used as the rotor 2, instead of the SPM rotor. When the rotor 2 is the IPM rotor, the permanent magnets 22 as main magnets are inserted in a plurality of magnet insertion holes formed in the resin 21 or the rotor core.

The shaft 23 is inserted in, for example, a through hole formed in a center portion of the resin 21.

The shaft 23 is combined with the resin 21 by caulking or resin such as polybutylene terephthalate (PBT). The shaft 23 may be fixed in the resin 21 by press fit or shrinkage fit.
<Stator 3>

Figure 4:
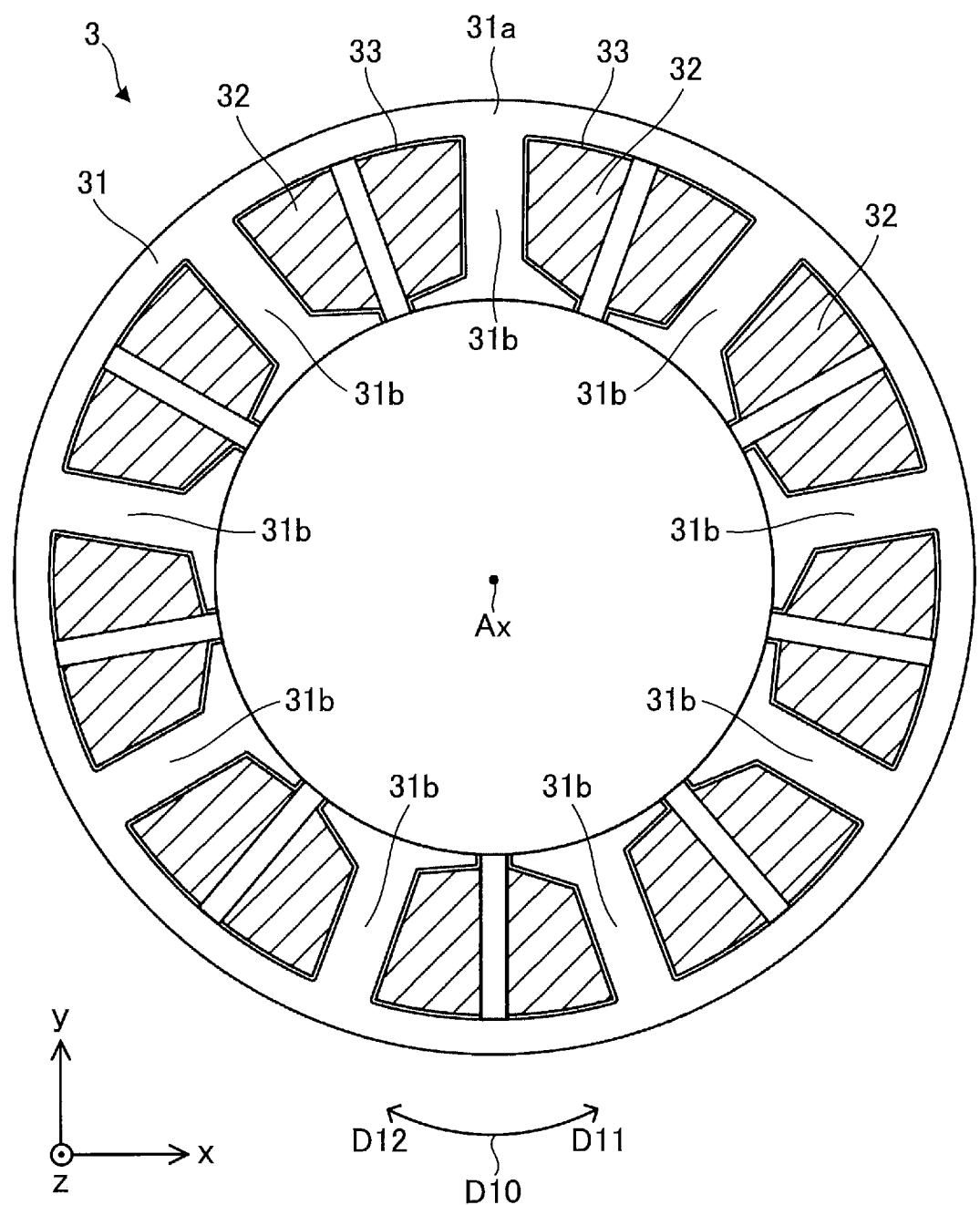
FIG. 4 is a cross-sectional view schematically illustrating a stator.

FIG. 4 is a cross-sectional view schematically illustrating the stator 3.

The stator 3 is disposed outside the rotor 2. The stator 3 includes the stator core 31 and at least one coil 32. The stator 3 may include at least one insulator 33.

The stator core 31 includes a core back 31a (also referred to as a yoke) and 9×N teeth 31b extending from the core back 31a toward the rotor 2. The core back 31a is, for example, an annular core back. In the present embodiment, N=1. Therefore, in an example shown in FIG. 4, the stator core 31 includes nine teeth 31b and nine slots.

Each tooth 31b extends in the radial direction. In other words, each tooth 31b extends from the core back 31a toward the rotation center of the rotor 2. In the example shown in FIG. 4, the stator core 31 includes nine teeth 31b.

The stator core 31 is composed of, for example, a plurality of thin plates made of iron having magnetism. The stator core 31 is, for example, a plurality of electrical steel sheets laminated in the axial direction. The stator core 31 is an annular core. A thickness of each electrical steel sheet of the stator core 31 is, for example, 0.2 mm to 0.5 mm.

Figure 5:
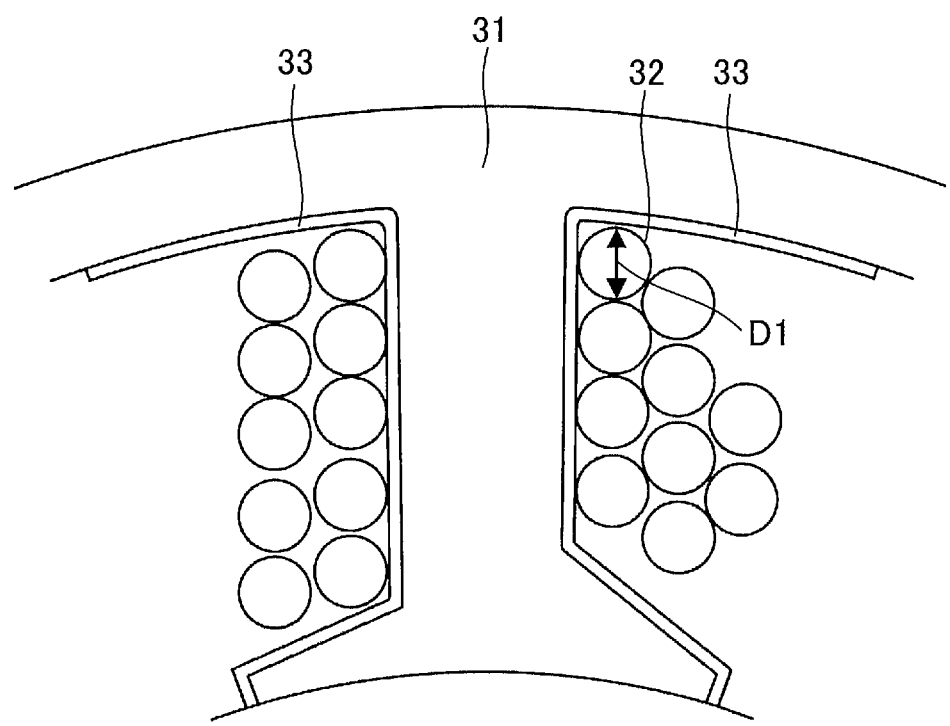
FIG. 5 is a cross-sectional view illustrating an example of a coil.

FIG. 5 is a cross-sectional view illustrating an example of the coil 32.

The coils 32 are three-phase coils. That is, the coils 32 have three-phase of U-phase, V-phase, and W-phase. Each coil 32 is wound around the tooth 31b by concentrated winding. The coils 32 are composed of windings each having a diameter of D1.

The coils 32 are wound around 9×N teeth 31b so that coils 32 wound around adjacent three teeth in the circumferential direction of the 9×N teeth form an identical phase.

When the stator 3 includes an insulator 33, the coil 32 is wound around the insulator 33 attached to the stator core 31. In this case, the coil 32 is insulated by the insulator 33. The coil 32 is made of, for example, material containing copper or aluminum.

The insulator 33 is made of, for example, an insulative resin such as polybutylene terephthalate (PBT), polyphenylene sulfide (PPS), liquid crystal polymer (LCP), or polyethylene terephthalate (PET). The insulator 33 that is made of resin is, for example, an insulating film having a thickness of 0.035 mm to 0.4 mm.

For example, the insulator 33 is molded unitedly with the stator core 31. Note, however, that the insulator 33 may be molded separately from the stator core 31. In this case, after the insulator 33 has been molded, the insulator 33 is fitted in the stator core 31.

In the present embodiment, the stator core 31, the coil 32, and the insulator 33 are covered with the molding resin 5. The stator core 31, the coil 32, and the insulator 33 may be fixed by a cylindrical shell made of material containing iron, for example. In this case, the stator 3 is covered with a cylindrical shell by shrink fit together with the rotor 2, for example.

The circuit board 4 is fixed to the stator 3. The circuit board 4 includes a driving device for controlling the electric motor 1.

The molding resin 5 unites the circuit board 4 and the stator 3 to each other. The molding resin 5 is, for example, a thermosetting resin such as an unsaturated polyester resin (BMC) or an epoxy resin.

The stator core 31 will be described specifically.

Figure 6:
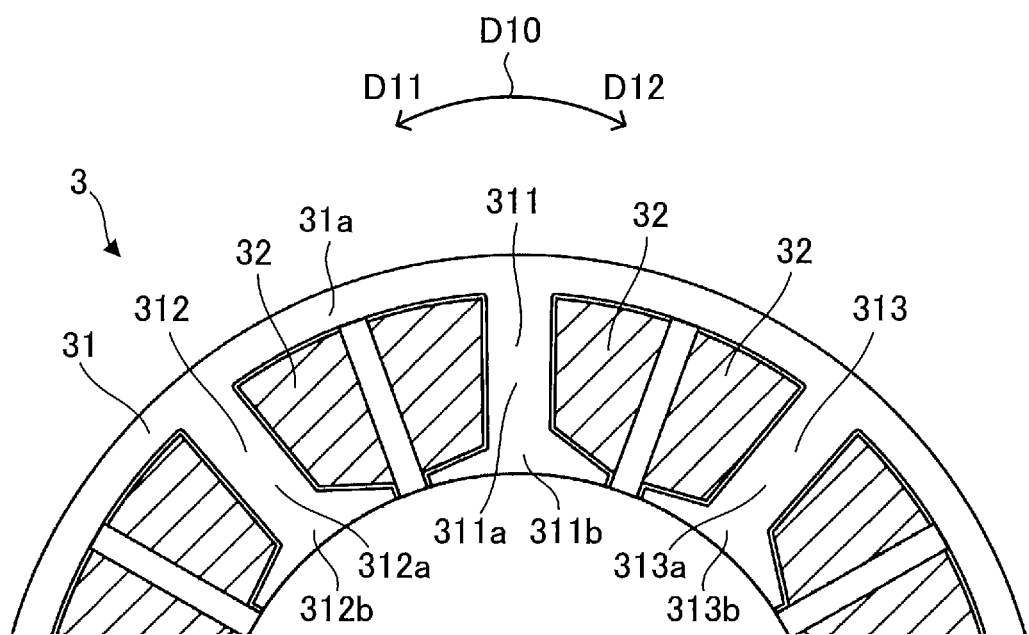
FIG. 6 is an enlarged view illustrating a part of the stator shown in FIG. 4.

FIG. 6 is an enlarged view illustrating a part of the stator 3 shown in FIG. 4.

The tooth 31b located at the center of the adjacent three teeth 31b in the circumferential direction in the xy plane is referred to as "a center tooth 311." The tooth 31b, of the adjacent three teeth 31b in the circumferential direction, located on the downstream side in the rotation direction of the rotor 2 in the xy plane is referred to as "a downstream-side tooth 312." The tooth 31b, of the adjacent three teeth 31b in the circumferential direction, located on the upstream side in the rotation direction of the rotor 2 in the xy plane is referred to as "an upstream-side tooth 313."

The coil 32 forming an identical phase is wound around the center tooth 311, the downstream-side tooth 312, and the upstream-side tooth 313. That is, the coil 32 wound around the center tooth 311, the coil 32 wound around the downstream-side tooth 312, and the coil 32 wound around the upstream-side tooth 313 are form the identical phase (e.g., U-phase, V-phase, or W-phase) when an electric current flows through the coil 32.

<Center Tooth 311>

Figure 7:
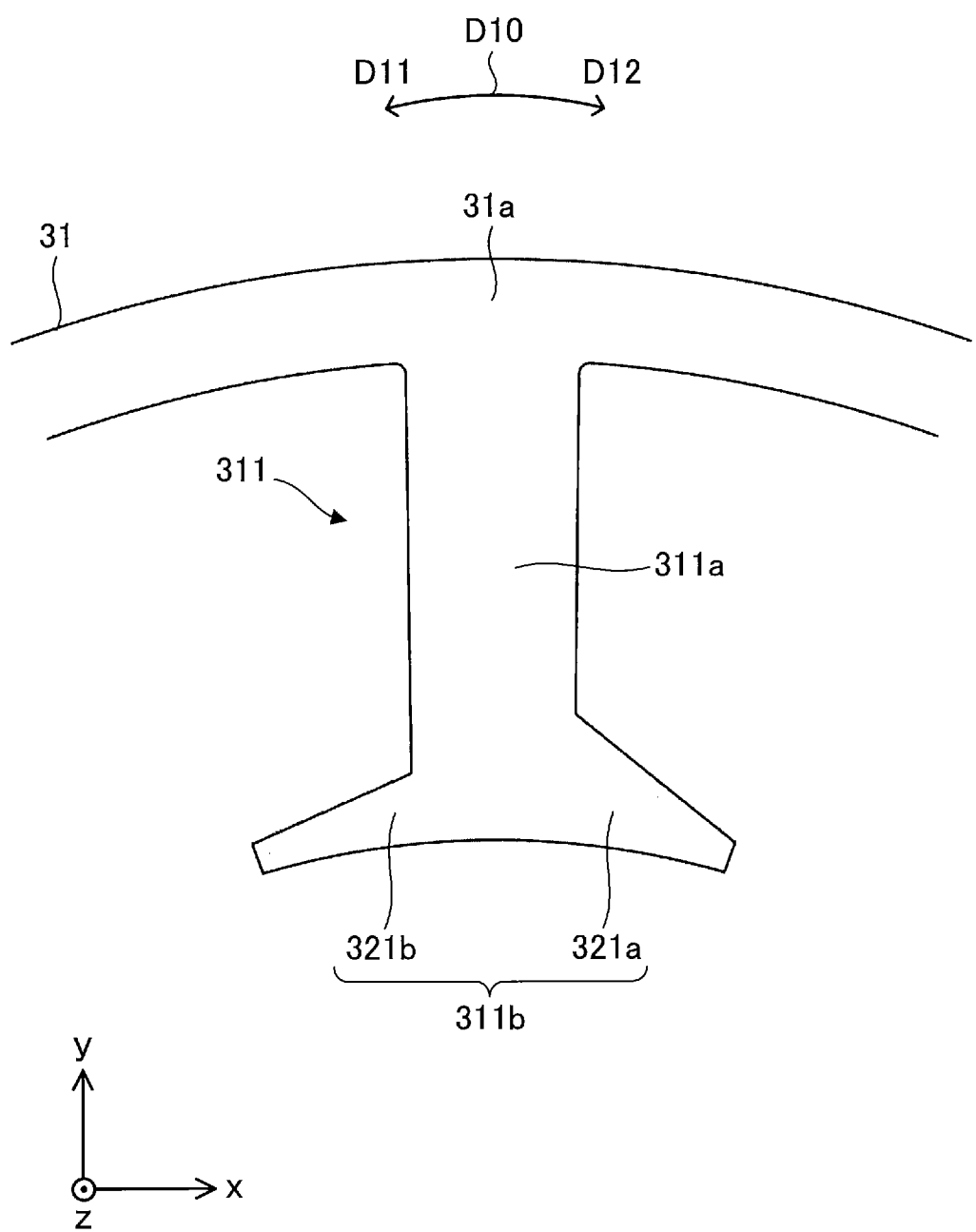
FIG. 7 is a plan view illustrating a center tooth.

FIG. 7 is a plan view illustrating the center tooth 311.

The center tooth 311 is the tooth located at the center of the adjacent three teeth 31b in the circumferential direction around which the coil 32 forming the identical phase is wound. The center tooth 311 includes a first main body 311a (also referred to as a center main body) and a first tooth end portion 311b (also referred to as a center tooth end portion).

The first main body 311a extends from the core back 31a toward the rotor 2. The first tooth end portion 311b is located in the end portion of the center tooth 311 in the radial direction and extends in the circumferential direction. The first tooth end portion 311b faces the rotor 2.

The first tooth end portion 311b includes a first upstream-side portion 321a located on the upstream side in the rotation direction of the rotor 2 and a first downstream-side portion 321b located on the downstream side in the rotation direction of the rotor 2.

<Downstream-Side Tooth 312>

Figure 8:
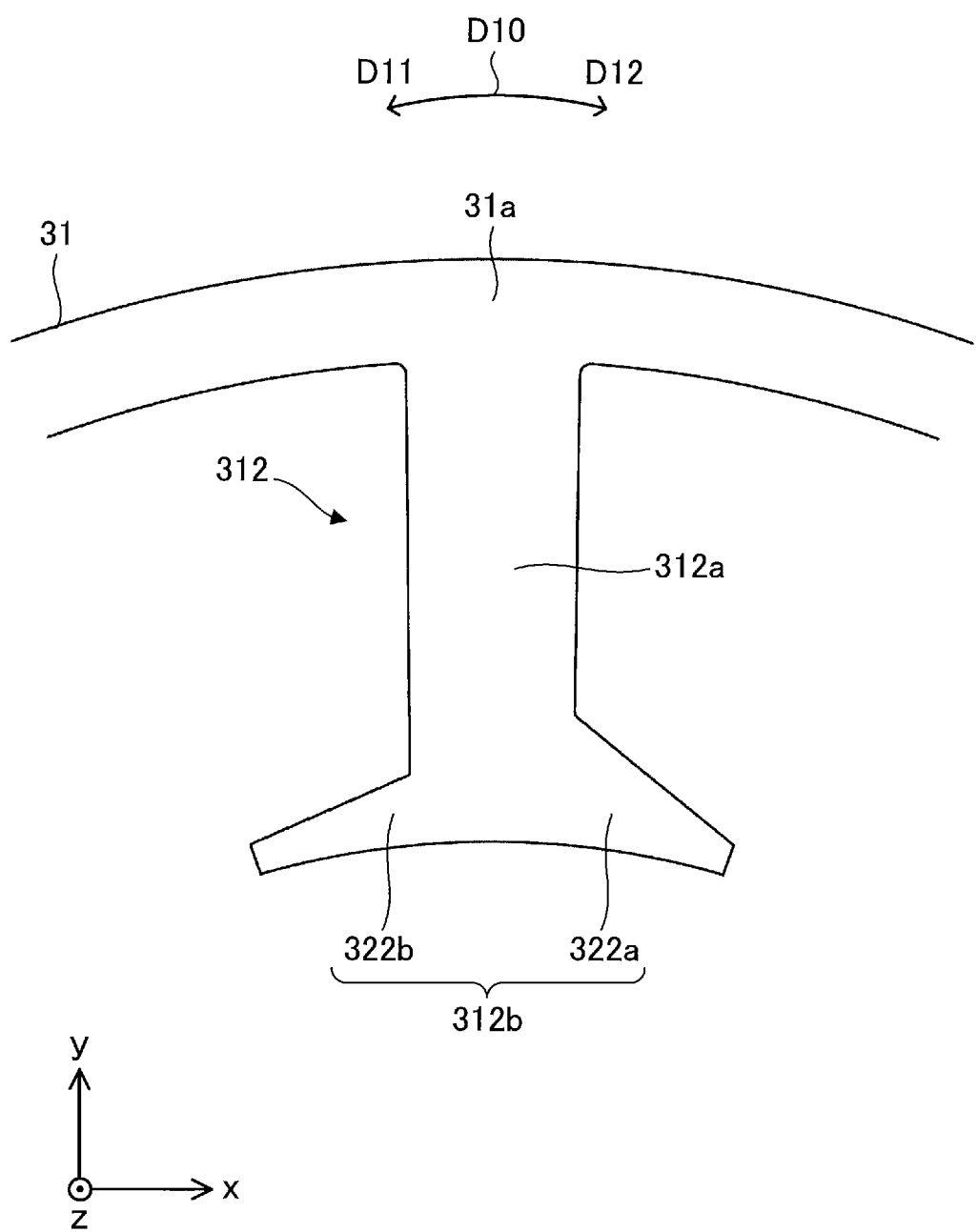
FIG. 8 is a plan view illustrating a downstream-side tooth.

FIG. 8 is a plan view illustrating the downstream-side tooth 312.

The downstream-side tooth 312 is the tooth located on the downstream side in the rotation direction of the rotor 2, of the adjacent three teeth 31b in the circumferential direction around which the coil 32 forming the identical phase is wound. That is, the downstream-side tooth 312 is located on the downstream side with respect to the center tooth 311 in the rotation direction of the rotor 2. The downstream-side tooth 312 includes a second main body 312a (also referred to as a downstream-side main body) and a second tooth end portion 312b (also referred to as a downstream-side tooth end portion).

The second main body 312a extends from the core back 31a toward the rotor 2. The second tooth end portion 312b is located in the end portion of the downstream-side tooth 312 in the radial direction and extends in the circumferential direction. The second tooth end portion 312b faces the rotor 2.

The second tooth end portion 312b includes a second upstream-side portion 322a located on the upstream side in the rotation direction of the rotor 2 and a second downstream-side portion 322b located on the downstream side in the rotation direction of the rotor 2.

<Upstream-Side Tooth 313>

Figure 9:
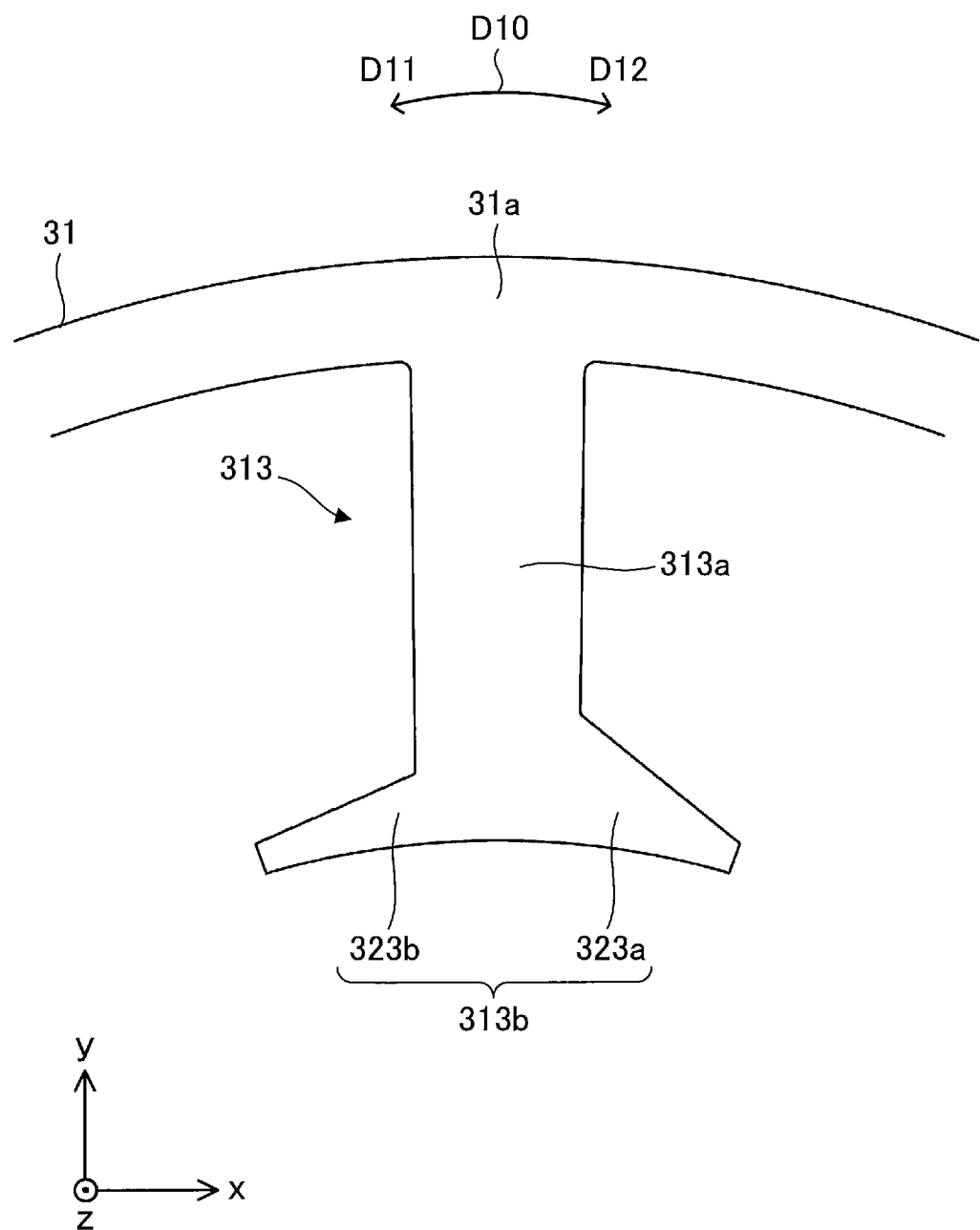
FIG. 9 is a plan view illustrating an upstream-side tooth.

FIG. 9 is a plan view illustrating the upstream-side tooth 313.

The upstream-side tooth 313 is the tooth located on the upstream side in the rotation direction of the rotor 2, of the adjacent three teeth 31b in the circumferential direction around which the coil 32 forming the identical phase is wound. That is, the upstream-side tooth 313 is located on the upstream side with respect to the center tooth 311 in the rotation direction of the rotor 2. The upstream-side tooth 313 includes a third main body 313a (also referred to as an upstream-side main body) and a third tooth end portion 313b (also referred to as an upstream-side tooth end portion).

The third main body 313a extends from the core back 31a toward the rotor 2. The third tooth end portion 313b is located in the end portion of the upstream-side tooth 313 in the radial direction and extends in the circumferential direction. The third tooth end portion 313b faces the rotor 2.

The third tooth end portion 313b includes a third upstream-side portion 323a located on the upstream side in the rotation direction of the rotor 2 and a third downstream-side portion 323b located on the downstream side in the rotation direction of the rotor 2.

Figure 10:
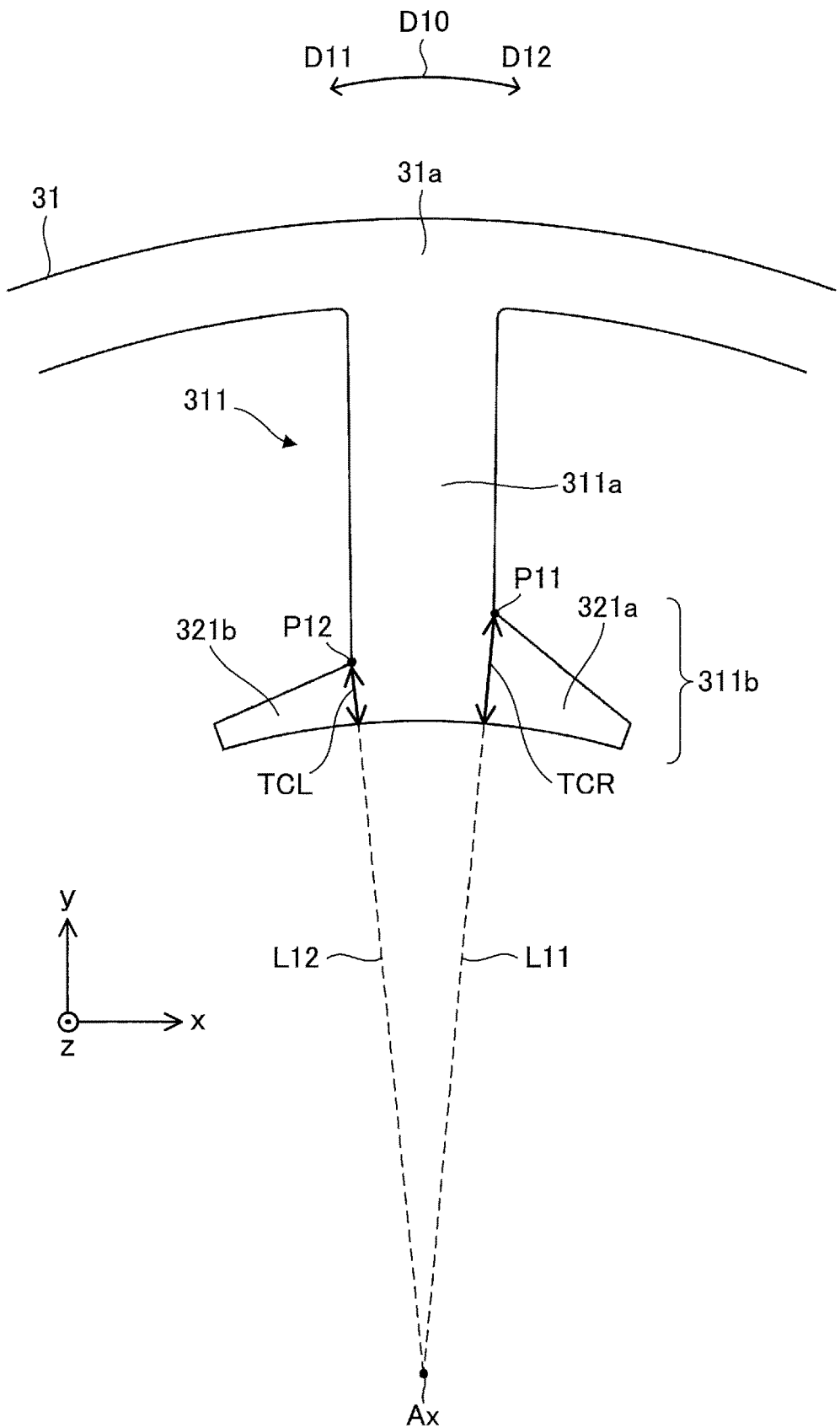
FIG. 10 is a plan view illustrating the center tooth.

FIG. 10 is a plan view illustrating the center tooth 311.

A direction parallel to a first upstream-side line L11 passing through the rotation center of the rotor 2 and a boundary P11 between the first main body 311a and the first upstream-side portion 321a in the xy plane is defined as "a first upstream-side radial direction." A direction parallel to a first downstream-side line L12 passing through the rotation center of the rotor 2 and a boundary P12 between the first main body 311a and the first downstream-side portion 321b in the xy plane is defined as "a first downstream-side radial direction."

As shown in FIG. 10, a length TCR is the length of the first tooth end portion 311b (specifically, the first upstream-side portion 321a) on the first upstream-side line L11 in the xy plane. In the present embodiment, the length TCR is a maximum length of the first tooth end portion 311b (specifically, the first upstream-side portion 321a) in the first upstream-side radial direction in the xy plane. As shown in FIG. 10, a length TCL is the length of the first tooth end portion 311b (specifically, the first downstream-side portion 321b) on the first downstream-side line L12 in the xy plane. In the present embodiment, the length TCL is a maximum length of the first tooth end portion 311b (specifically, the first downstream-side portion 321b) in the first downstream-side radial direction in the xy plane.

Figure 11:
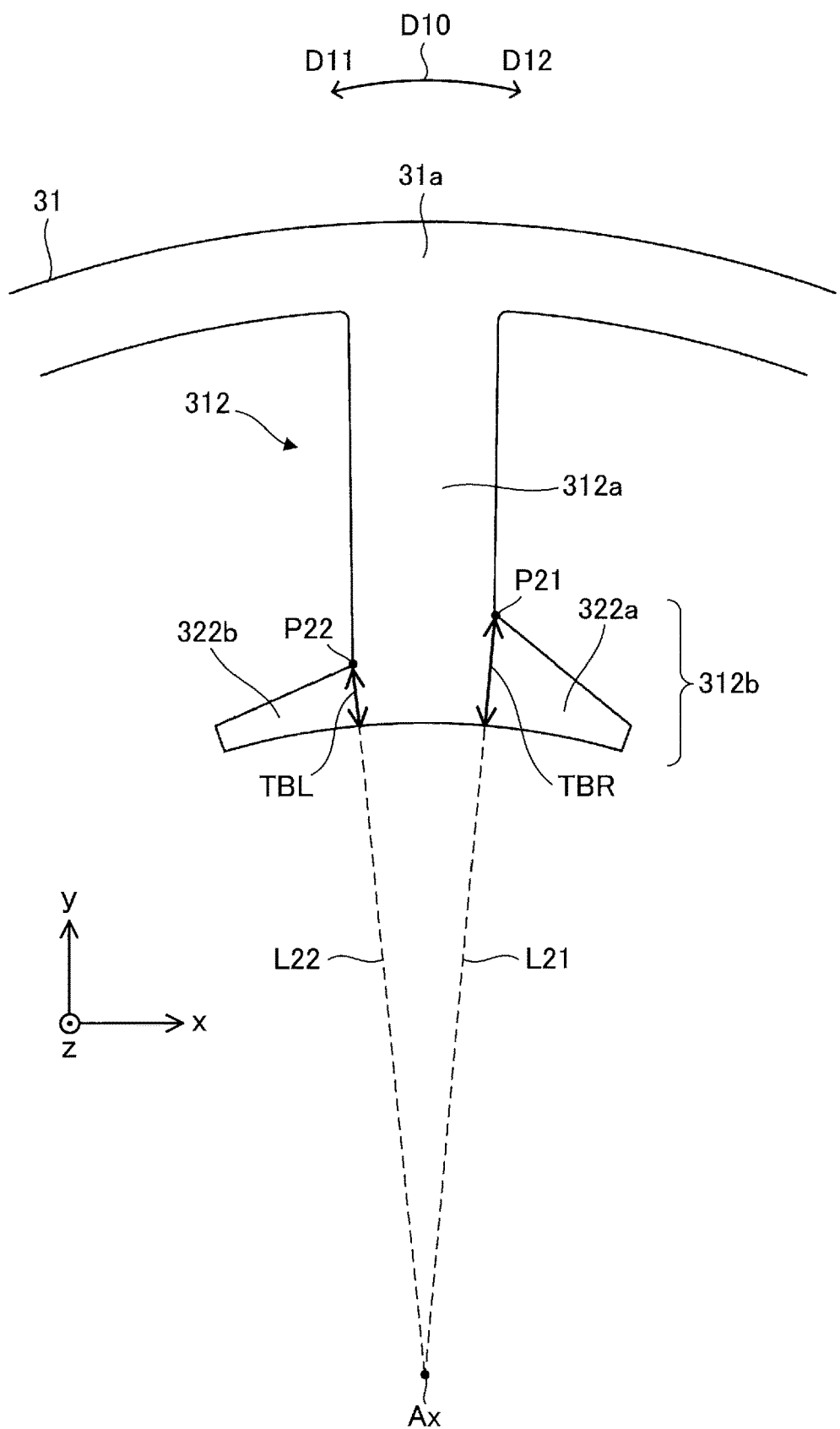
FIG. 11 is a plan view illustrating the downstream-side tooth.

FIG. 11 is a plan view illustrating the downstream-side tooth 312.

A direction parallel to a second upstream-side line L21 passing through the rotation center of the rotor 2 and a boundary P21 between the second main body 312a and the second upstream-side portion 322a in the xy plane is defined as "a second upstream-side radial direction." A direction parallel to a second downstream-side line L22 passing through the rotation center of the rotor 2 and a boundary P22 between the second main body 312a and the second downstream-side portion 322b in the xy plane is defined as "a second downstream-side radial direction."

As shown in FIG. 11, a length TBR is the length of the second tooth end portion 312b (specifically, the second upstream-side portion 322a) on the second upstream-side line L21 in the xy plane. In the present embodiment, the length TBR is a maximum length of the second tooth end portion 312b (specifically, the second upstream-side portion 322a) in the second upstream-side radial direction in the xy plane. As shown in FIG. 11, a length TBL is the length of the second tooth end portion 312b (specifically, the second downstream-side portion 322b) on the second downstream-side line L22 in the xy plane. In the present embodiment, the length TBL is a maximum length of the second tooth end portion 312b (specifically, the second downstream-side portion 322b) in the second downstream-side radial direction in the xy plane.

Figure 12:
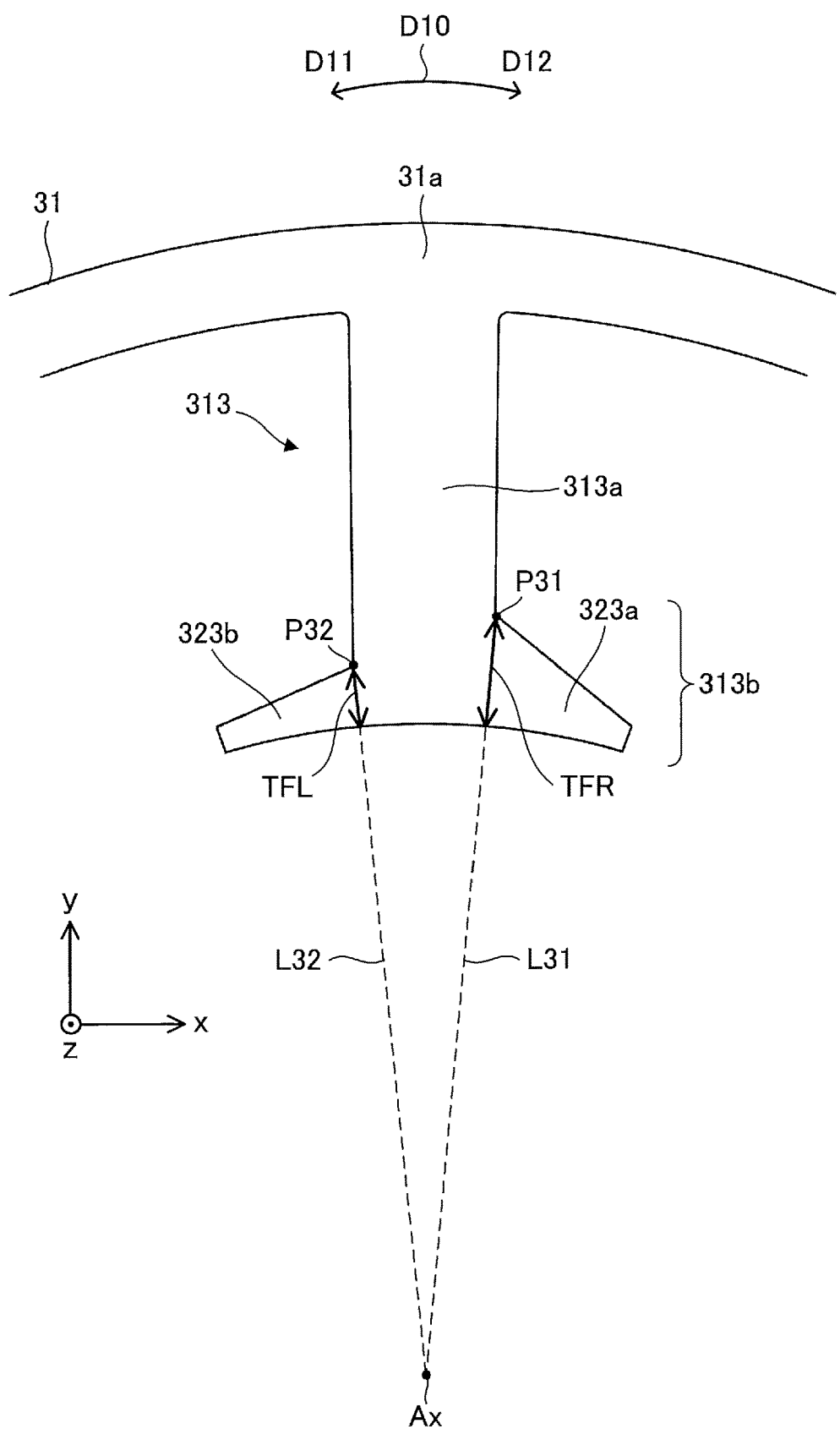
FIG. 12 is a plan view illustrating the upstream-side tooth.

FIG. 12 is a plan view illustrating the upstream-side tooth 313.

A direction parallel to a third upstream-side line L31 passing through the rotation center of the rotor 2 and a boundary P31 between the third main body 313a and the third upstream-side portion 323a in the xy plane is defined as "a third upstream-side radial direction." A direction parallel to a third downstream-side line L32 passing through the rotation center of the rotor 2 and a boundary P32 between the third main body 313a and the third downstream-side portion 323b in the xy plane is defined as "a third downstream-side radial direction."

As shown in FIG. 12, a length TFR is the length of the third tooth end portion 313b (specifically, the third upstream-side portion 323a) on the third upstream-side line L31 in the xy plane. In the present embodiment, the length TFR is a maximum length of the third tooth end portion 313b (specifically, the third upstream-side portion 323a) in the third upstream-side radial direction in the xy plane. As shown in FIG. 12, a length TFL is the length of the third tooth end portion 313b (specifically, the third downstream-side portion 323b) on the third downstream-side line L32 in the xy plane. In the present embodiment, the length TFL is a maximum length of the third tooth end portion 313b (specifically, the third downstream-side portion 323b) in the third downstream-side radial direction in the xy plane.

Figure 13:
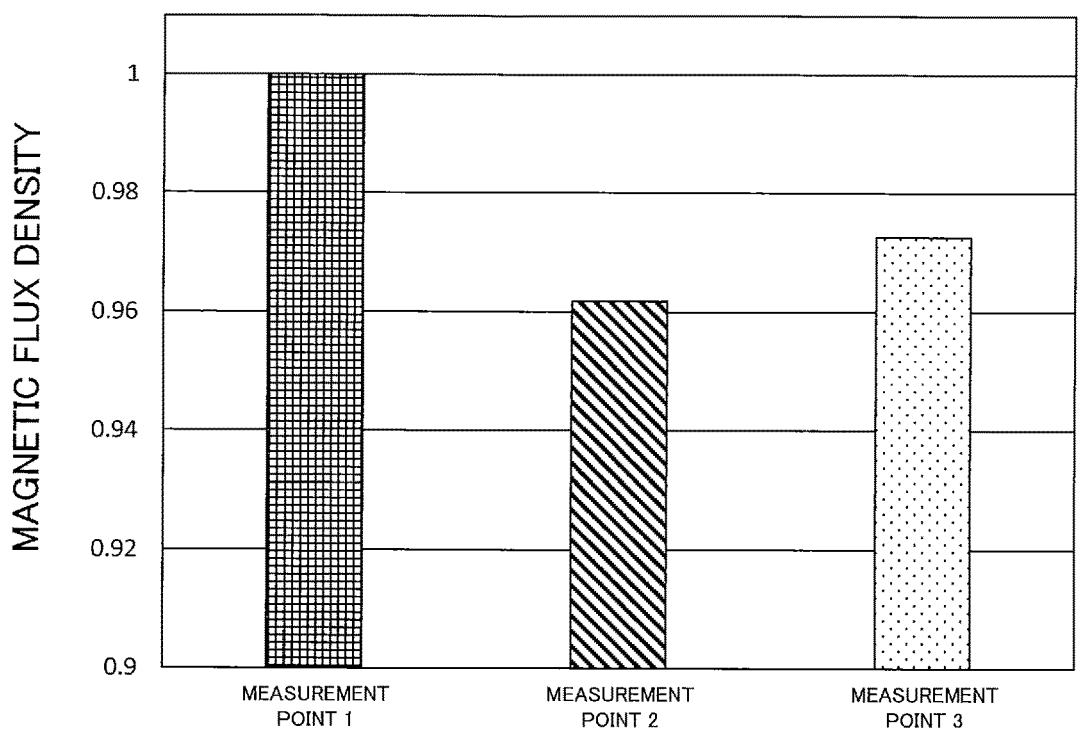
FIG. 13 is a graph showing the maximum value of magnetic flux density of an upstream-side portion of each tooth end portion of adjacent three teeth, in a circumferential direction, around which a coil forming an identical phase is wound during the rotation of a rotor of an electric motor as a comparative example.

FIG. 13 is a graph showing the maximum value of magnetic flux density of an upstream-side portion of each tooth end portion of adjacent three teeth, in a circumferential direction, around which a coil forming an identical phase is wound during the rotation of a rotor of an electric motor as a comparative example. Shapes of these three teeth are identical. In FIG. 13, a measurement point 1 is the upstream-side portion of the tooth end portion of the center tooth of the three teeth. Assume the maximum value of the magnetic flux density at the measurement point 1 is one. A measurement point 2 is the upstream-side portion of the tooth end portion of the downstream-side tooth of the three teeth. The graph at the measurement point 2 shows the ratio to the maximum value of the magnetic flux density at the measurement point 1. A measurement point 3 is the upstream-side portion of the tooth end portion of the upstream-side tooth of the three teeth. The graph at the measurement point 3 shows the ratio to the maximum value of the magnetic flux density at the measurement point 1.

In this case, as shown in FIG. 13, the magnetic flux density in the upstream-side portion of the tooth end portion of the center tooth is the largest, and the magnetic flux density in the upstream-side portion of the tooth end portion of the downstream-side tooth is the smallest.

That is, the magnetic flux flowing into the center tooth is the largest in the magnetic flux flowing into the adjacent three teeth, in the circumferential direction, around which a coil forming an identical phase is wound. The magnetic flux flowing into the center tooth is the smallest in the magnetic flux flowing into the adjacent three teeth, in the circumferential direction, around which the coil forming the identical phase is wound. For that reason, an imbalance between the center tooth and the downstream-side tooth occurs about the magnetic flux density. This imbalance causes a noise during the rotation of the rotor.

Figure 14:
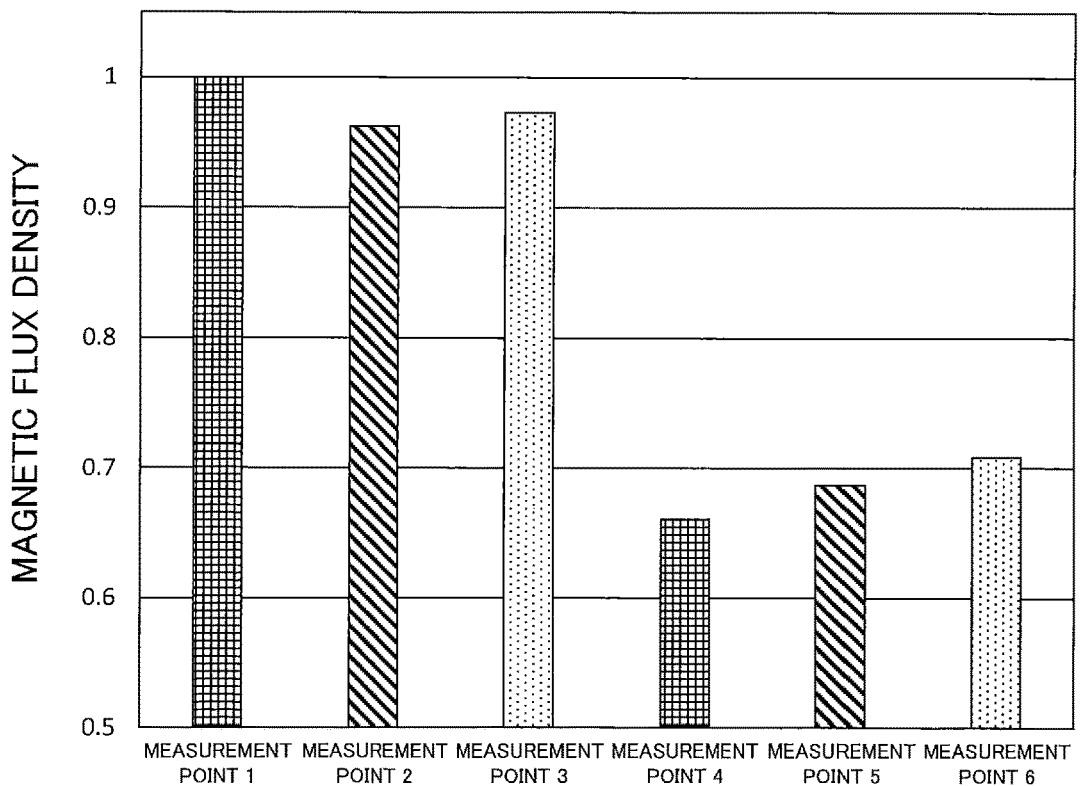
FIG. 14 is a graph showing the maximum value of magnetic flux density of each measurement point of each tooth end portion of the adjacent three teeth, in the circumferential direction, around which the coil forming the identical phase is wound during the rotation of the rotor of the electric motor as the comparative example.

FIG. 14 is a graph showing the maximum value of magnetic flux density of each measurement point of each tooth end portion of the adjacent three teeth, in the circumferential direction, around which the coil forming the identical phase is wound during the rotation of the rotor of the electric motor as the comparative example. Measurement points 1 to 3 in FIG. 14 correspond to the measurement points 1 to 3 in FIG. 13 respectively.

A measurement point 4 in FIG. 14 is the downstream-side portion of the tooth end portion of the center tooth of the three teeth. The graph at the measurement point 4 shows the ratio to the maximum value of the magnetic flux density at the measurement point 1. A measurement point 5 in FIG. 14 is the downstream-side portion of the tooth end portion of the downstream-side tooth of the three teeth. The graph at the measurement point 5 shows the ratio to the maximum value of the magnetic flux density at the measurement point 1. A measurement point 6 in FIG. 14 is the downstream-side portion of the tooth end portion of the upstream-side tooth of the three teeth. The graph at the measurement point 6 shows the ratio to the maximum value of the magnetic flux density at the measurement point 1.

In the present embodiment, a relationship between the length TCR and the length TBR satisfies TCR>TBR. Therefore, the magnetic flux density in the second upstream-side portion 322a of the downstream-side tooth 312 during the rotation of the rotor 2 increases. For that reason, a difference between the magnetic flux density in the second upstream-side portion 322a of the downstream-side tooth 312 and the magnetic flux density in the first upstream-side portion 321a of the center tooth 311 reduces in comparison with the comparative example. As a result, an imbalance between the downstream-side tooth 312 and the center tooth 311 improves, and thus a noise during the rotation of the rotor 2 can be reduced in comparison with the comparative example.

When the relationship between the length TCR and the length TBR satisfies TCR>TBR, a surface area of the downstream-side tooth 312 for winding the coil 32 increases. For that reason, the amount of the coil 32 wound around the downstream-side tooth 312 can be increased, and thus copper loss can be reduced. As a result, it is possible to increase efficiency of the electric motor 1.

As shown in FIG. 13, the magnetic flux density in the upstream-side portion of the tooth end portion of the upstream-side tooth is larger than the magnetic flux density in the upstream-side portion of the tooth end portion of the downstream-side tooth. For that reason, the relationship between the length TFR and the length TBR satisfies TFR>TBR in the present embodiment. Thus, the magnetic flux density in the second upstream-side portion 322a of the downstream-side tooth 312 during the rotation of the rotor 2 increases. Accordingly, a difference between the magnetic flux density in the second upstream-side portion 322a of the downstream-side tooth 312 (i.e., the measurement point 2) and the magnetic flux density in the third upstream-side portion 323a of the upstream-side tooth 313 (i.e., the measurement point 3) reduces in comparison with the comparative example. As a result, a noise during the rotation of the rotor 2 can be reduced in comparison with the comparative example.

As shown in FIG. 13, the magnetic flux density in the upstream-side portion of the tooth end portion of the center tooth (i.e., the measurement point 1) is the largest, the magnetic flux density in the upstream-side portion of the tooth end portion of the upstream-side tooth (i.e., the measurement point 3) is the second largest, and the magnetic flux density in the upstream-side portion of the tooth end portion of the downstream-side tooth (i.e., the measurement point 2) is the smallest. For that reason, the relationship between the length TCR, the length TFR, and the length TBR satisfies TCR>TFR>TBR in the present embodiment. Therefore, a difference of the magnetic flux density between the three teeth 311, 312, and 313 reduces in comparison with the comparative example. As a result, a noise during the rotation of the rotor 2 can be reduced in comparison with the comparative example.

As shown in FIG. 14, in the center tooth, the magnetic flux density in the downstream-side portion (i.e., the measurement point 4) of the tooth end portion is smaller than the magnetic flux density in the upstream-side portion (i.e., the measurement point 1) of the tooth end portion. For that reason, the relationship between the length TCR and the length TCL satisfies TCR>TCL in the present embodiment. Thus, the magnetic flux density in the first downstream-side portion 321b of the center tooth 311 during the rotation of the rotor 2 increases in comparison with the comparative example. Therefore, in the center tooth 311, a difference between the magnetic flux density in the first downstream-side portion 321b and the magnetic flux density in the first upstream-side portion 321a reduces in comparison with the comparative example. As a result, a noise during the rotation of the rotor 2 can be reduced in comparison with the comparative example.

As shown in FIG. 14, in the downstream-side tooth, the magnetic flux density in the downstream-side portion (i.e., the measurement point 5) of the tooth end portion is smaller than the magnetic flux density in the upstream-side portion (i.e., the measurement point 2) of the tooth end portion. For that reason, the relationship between the length TBR and the length TBL satisfies TBR>TBL in the present embodiment. Thus, the magnetic flux density in the second downstream-side portion 322b of the downstream-side tooth 312 during the rotation of the rotor 2 increases in comparison with the comparative example. Therefore, in the downstream-side tooth 312, a difference between the magnetic flux density in the second downstream-side portion 322b and the magnetic flux density in the second upstream-side portion 322a reduces in comparison with the comparative example. As a result, a noise during the rotation of the rotor 2 can be reduced in comparison with the comparative example.

As shown in FIG. 14, in the upstream-side tooth, the magnetic flux density in the downstream-side portion (i.e., the measurement point 6) of the tooth end portion is smaller than the magnetic flux density in the upstream-side portion (i.e., the measurement point 3) of the tooth end portion. For that reason, the relationship between the length TFR and the length TFL satisfies TFR>TFL in the present embodiment. Thus, the magnetic flux density in the third downstream-side portion 323b of the upstream-side tooth 313 during the rotation of the rotor 2 increases in comparison with the comparative example. Therefore, in the upstream-side tooth 313, a difference between the magnetic flux density in the third downstream-side portion 323b and the magnetic flux density in the third upstream-side portion 323a reduces in comparison with the comparative example. As a result, a noise during the rotation of the rotor 2 can be reduced in comparison with the comparative example.

As shown in FIG. 14, with regard to the density of the magnetic flux flowing into the downstream-side portion of the tooth end portion, the magnetic flux density in the upstream-side tooth (i.e., the measurement point 6) is the largest, the magnetic flux density in the downstream-side tooth (i.e., the measurement point 5) is the second largest, and the magnetic flux density in the center tooth (i.e., the measurement point 4) is the smallest. For that reason, the relationship between the length TFL, the length TBL, and the length TCL satisfies TFL>TBL>TCL in the present embodiment. Therefore, a difference of the magnetic flux density between the three teeth 311, 312, and 313 reduces in comparison with the comparative example. As a result, a noise during the rotation of the rotor 2 can be reduced in comparison with the comparative example.

As shown in FIG. 14, the magnetic flux density in the upstream-side portion of the center tooth (i.e., the measurement point 1) is the largest, followed by the upstream-side portion of the upstream-side tooth (i.e., the measurement point 3), the upstream-side portion of the downstream-side tooth (i.e., the measurement point 2), the downstream-side portion of the upstream-side tooth (i.e., the measurement point 6), the downstream-side portion of the downstream-side tooth (i.e., the measurement point 5), and the downstream-side portion of the center tooth (i.e., the measurement point 4). For that reason, the relationship between the length TCR, the length TFR, the length TBR, the length TFL, the length TBL, and the length TCL satisfies TCR>TFR>TBR>TFL>TBL>TCL in the present embodiment. Therefore, a difference of the magnetic flux density between the three teeth 311, 312, and 313 reduces in comparison with the comparative example. As a result, a noise during the rotation of the rotor 2 can be reduced in comparison with the comparative example.

When the coil 32 is composed of winding having a diameter of D1, a relationship between the length TCR, the length TCL, and the diameter D1 satisfies (TCR−TCL)≥D1. In this case, TCR>TCL is satisfied, and it is possible to increase a surface area of the center tooth 311 around which the winding can be wound. As a result, the density of the coil 32 in the slot can be increased, copper loss can be reduced, and thus it is possible to improve the efficiency of the electric motor 1.

It is more desirable that the relationship between the length TCR, the length TCL, and the diameter D1 satisfy (TCR−TCL)=D1. In this case, it is possible to use effectively a space in the slot of the stator 3. That is, it is possible to effectively wind the coil 32 around the center tooth 311. As a result, the stator 3 can be downsized, and thus it is possible to improve the efficiency of the electric motor 1.

When the coil 32 is composed of winding having a diameter of D1, a relationship of the length TBR, the length TBL, and the diameter D1 is satisfies (TBR−TBL)≥D1. In this case, TBR>TBL is satisfied, and it is possible to increase a surface area of the downstream-side tooth 312 around which the winding can be wound. As a result, the density of the coil 32 in the slot can be increased, copper loss can be reduced, and thus it is possible to improve the efficiency of the electric motor 1.

It is more desirable that the relationship between the length TBR, the length TBL, and the diameter D1 satisfy (TBR−TBL)=D1. In this case, it is possible to use effectively a space in the slot of the stator 3. That is, it is possible to effectively wind the coil 32 around the downstream-side tooth 312. As a result, the stator 3 can be downsized, and thus it is possible to improve the efficiency of the electric motor 1.

When the coil 32 is composed of winding having a diameter of D1, a relationship of the length TFR, the length TFL, and the diameter D1 is satisfies (TFR−TFL)≥D1. In this case, TFR>TFL is satisfied, and it is possible to increase a surface area of the upstream-side tooth 313 around which the winding can be wound. As a result, the density of the coil 32 in the slot can be increased, copper loss can be reduced, and thus it is possible to improve the efficiency of the electric motor 1.

It is more desirable that the relationship between the length TFR, the length TFL, and the diameter D1 satisfy (TFR−TFL)=D1. In this case, it is possible to use effectively a space in the slot of the stator 3. That is, it is possible to effectively wind the coil 32 around the upstream-side tooth 313. As a result, the stator 3 can be downsized, and thus it is possible to improve the efficiency of the electric motor 1.

Variation

Figure 15:
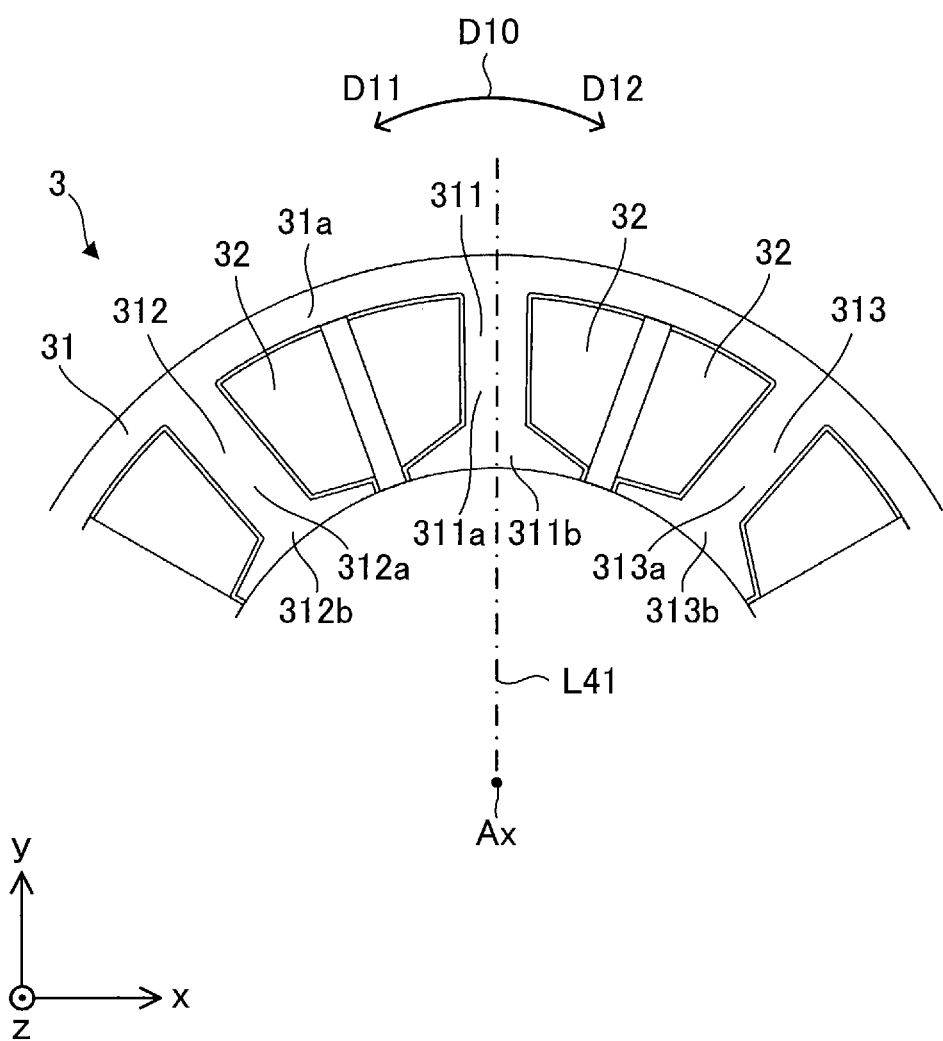
FIG. 15 is a diagram illustrating another example of a stator core.

FIG. 15 is a diagram illustrating another example of the stator core 31.

In the variation, the center tooth 311, the downstream-side tooth 312, and the upstream-side 313 have line symmetry about a center line L41 passing through the center of the center tooth 311 in the radial direction in the xy plane. Therefore, the length TCR is equal to the length TCL, the length TBR is equal to the length TFL, and the length TBL is equal to the length TFR.

In this case, the structure of the front side of the stator core 31 is same as the structure of the reverse of the stator core 31. Therefore, in a process of producing the electric motor, it is possible to produce the electric motor without taking any notice of the direction of the stator core 31. When the stator core 31 is disposed in a die, it is possible to dispose the stator core 31 in the die without taking any notice of the direction of the stator core 31, for example. As a result, it is possible to improve operating efficiency.

Second Embodiment

Figure 16:
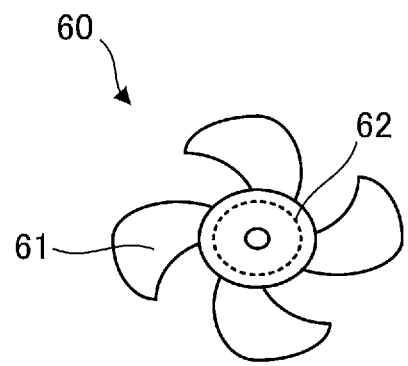
FIG. 16 is a diagram schematically illustrating a fan according to a second embodiment.

FIG. 16 is a diagram schematically illustrating a fan 60 according to a second embodiment.

The fan 60 includes blades 61 and an electric motor 62. The fan 60 is also referred to as a blower. The blades 61 are formed of, for example, polypropylene (PP) containing glass fiber.

The electric motor 62 is the electric motor 1 according to the first embodiment. The blades 61 are fixed to a shaft of the electric motor 62. The electric motor 62 drives the blades 61. Specifically, the electric motor 62 rotates the blades 61. When the electric motor 62 is driven, the blades 61 rotate, and thus an airflow is generated. Accordingly, the fan 60 can send air.

In the fan 60 according to the second embodiment, since the electric motor 1 described in the first embodiment is applied to the electric motor 62, the same advantages as those described in the first embodiment can be obtained. In addition, it is possible to enhance the efficiency of the fan 60.

Third Embodiment

An air conditioner 50 (also referred to as a refrigerating air conditioner or a refrigeration cycle device) according to a third embodiment will be described.

Figure 17:
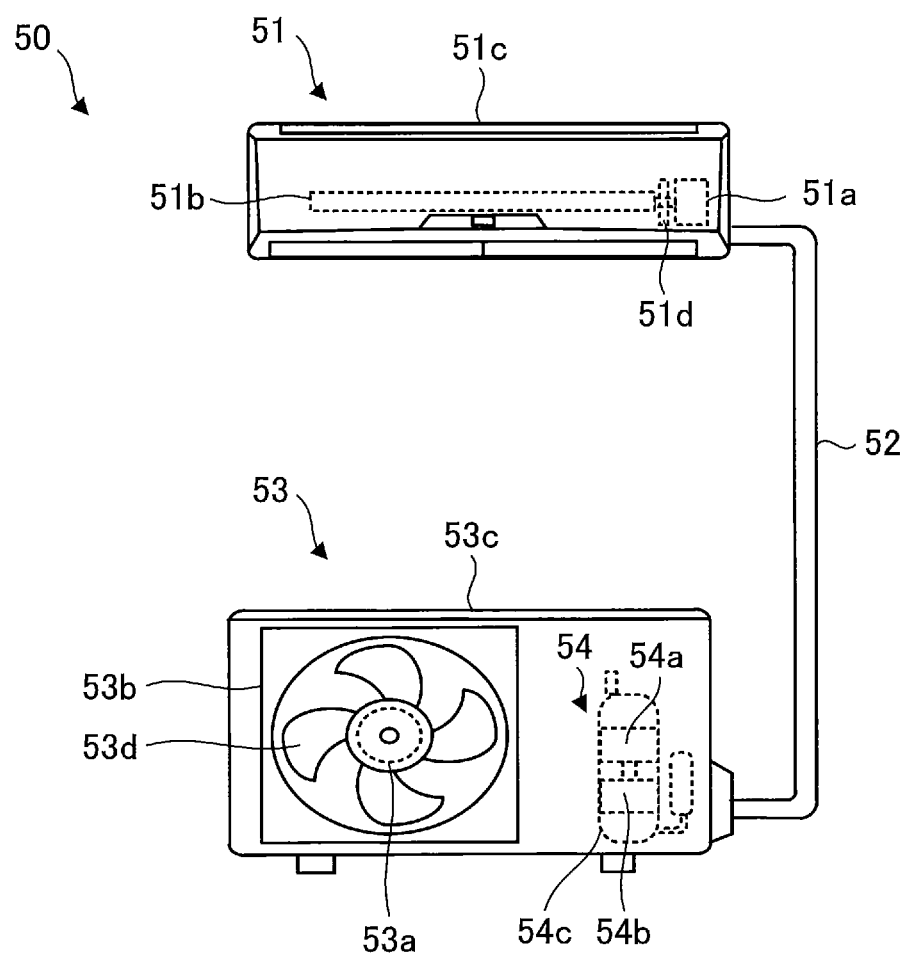
FIG. 17 is a diagram schematically illustrating a configuration of an air conditioner according to a third embodiment.

FIG. 17 is a diagram schematically illustrating a configuration of the air conditioner 50 according to the third embodiment.

The air conditioner 50 according to the third embodiment includes an indoor unit 51 as a blower (first blower), a refrigerant pipe 52, and an outdoor unit 53 as a blower (second blower) connected to the indoor unit 51. For example, the outdoor unit 53 is connected to the indoor unit 51 through the refrigerant pipe 52.

The indoor unit 51 includes an electric motor 51a (e.g., the electric motor 1 according to the first embodiment), an air blowing unit 51b that supplies air when being driven by the electric motor 51a, and a housing 51c covering the electric motor 51a and the air blowing unit 51b. The air blowing unit 51b includes, for example, blades 51d that are driven by the electric motor 51a. For example, the blades 51d are fixed to a shaft of the electric motor 51a and generate an airflow.

The outdoor unit 53 includes an electric motor 53a (e.g., the electric motor 1 according to the first embodiment), an air blowing unit 53b, a compressor 54, a heat exchanger (not shown), and a housing 53c covering the air blowing unit 53b, the compressor 54, and the heat exchanger. When the air blowing unit 53b is driven by the electric motor 53a, the air blowing unit 53b supplies air. The air blowing unit 53b includes, for example, blades 53d that are driven by the electric motor 53a. For example, the blades 53d are fixed to a shaft of the electric motor 53a and generate an airflow. The compressor 54 includes an electric motor 54a (e.g., the electric motor 1 according to the first embodiment), a compression mechanism 54b (e.g., a refrigerant circuit) that is driven by the electric motor 54a, and a housing 54c covering the electric motor 54a and the compression mechanism 54b.

In the air conditioner 50, at least one of the indoor unit 51 or the outdoor unit 53 includes the electric motor 1 described in the first embodiment. That is, one or both of the indoor unit 51 and the outdoor unit 53 includes the electric motor 1 described in the first embodiment. Specifically, as a driving source of an air blowing unit, the electric motor 1 described in the first embodiment is applied to at least one of the electric motors 51a or 53a. That is, the electric motor 1 described in the first embodiment is applied to the indoor unit 51, the outdoor unit 53, or both the indoor unit 51 and the outdoor unit 53. The electric motor 1 described in the first embodiment may be applied to the electric motor 54a of the compressor 54.

The air conditioner 50 is capable of performing air conditioning such as a cooling operation of sending cold air from the indoor unit 51 and a heating operation of sending warm air from the indoor unit 51, for example. In the indoor unit 51, the electric motor 51a is a driving source for driving the air blowing unit 51b. The air blowing unit 51b is capable of sending conditioned air.

In the indoor unit 51, the electric motor 51a is fixed to the housing 51c of the indoor unit 51 by a screw, for example. In the outdoor unit 53, the electric motor 53a is fixed to the housing 53c of the outdoor unit 53 by a screw, for example.

In the air conditioner 50 according to the third embodiment, since the electric motor 1 described in the first embodiment is applied to at least one of the electric motors 51a or 53a, the same advantages as those described in the first embodiment can be obtained. As a result, it is possible to enhance the efficiency of the air conditioner 50.

Furthermore, in the case of using the electric motor 1 according to the first embodiment as a driving source of a blower (e.g., the indoor unit 51), the same advantages as those described in the first embodiment can be obtained. As a result, a decrease in air blower efficiency can be prevented. The blower including the electric motor 1 according to the first embodiment and the blades (e.g., the blades 51d or 53d) driven by the electric motor 1 can be used alone as a device for supplying air. This blower is also applicable to equipment other than the air conditioner 50.

Furthermore, in the case of using the electric motor 1 according to the first embodiment as a driving source of the compressor 54, the same advantages as those described in the first embodiment can be obtained. As a result, it is possible to enhance the efficiency of the compressor 54.

The electric motor 1 described in the first embodiment can be mounted on equipment including a driving source, such as a ventilator, a household electrical appliance, or a machine tool, as well as the air conditioner 50.

The feature of each embodiment and the feature of the variation described above can be combined.

DESCRIPTION OF REFERENCE CHARACTERS 1, 51a, 53a, 54a, 62 electric motor, 2 rotor, 3 stator, 21 resin, 22 permanent magnet, 31 stator core, 31a core back, 31b tooth, 32 coil, 311 center tooth, 311a first main body, 311b first tooth end portion, 312 downstream-side tooth, 312a second main body, 312b second tooth end portion, 313 upstream-side tooth, 313a third main body, 313b third tooth end portion, 321a first upstream-side portion, 321b first downstream-side portion, 322a second upstream-side portion, 322b second downstream-side portion, 323a third upstream-side portion, 323b third downstream-side portion.

What is claimed:

1. An electric motor comprising:
a rotor having 10×N (N is an integer equal to or larger than 1) magnetic poles; and
a stator including an annular core back, 9×N teeth extending from the annular core back toward the rotor, and three-phase coils wound around the 9×N teeth by concentrated winding, wherein
the three-phase coils are wound around the 9×N teeth so as to form an identical phase, the three-phase coils being wound around three teeth of the 9×N teeth, the three teeth being adjacent in a circumferential direction,
a center tooth located at center of the three teeth around which the three-phase coils forming the identical phase are wound includes:
a first main body extending from the annular core back toward the rotor; and
a first tooth end portion located in an end portion of the center tooth and extending in the circumferential direction,
the first tooth end portion includes:
a first upstream-side portion located on an upstream side in a rotation direction of the rotor; and
a first downstream-side portion located on a downstream side in the rotation direction,
a downstream-side tooth, of the three teeth, located on a downstream side in the rotation direction includes:
a second main body extending from the annular core back toward the rotor; and
a second tooth end portion located in an end portion of the downstream-side tooth and extending in the circumferential direction,
the second tooth end portion includes:
a second upstream-side portion located on an upstream side in the rotation direction; and
a second downstream-side portion located on a downstream side in the rotation direction,
a direction parallel to a first upstream-side line passing through rotation center of the rotor and a boundary between the first main body and the first upstream-side portion in a plane perpendicular to an axial direction is defined as a first upstream-side radial direction,
a direction parallel to a second upstream-side line passing through the rotation center and a boundary between the second main body and the second upstream-side portion in the plane is defined as a second upstream-side radial direction, and
the electric motor satisfies TCR>TBR,
where TCR is a maximum length of the first upstream-side portion in the first upstream-side radial direction in the plane, and TBR is a maximum length of the second upstream-side portion in the second upstream-side radial direction in the plane.

2. The electric motor according to claim 1, wherein
an upstream-side tooth, of the three teeth, located on an upstream side in the rotation direction includes:
a third main body extending from the annular core back toward the rotor; and
a third tooth end portion located in an end portion of the upstream-side tooth and extending in the circumferential direction,
the third tooth end portion includes:
a third upstream-side portion located on an upstream side in the rotation direction; and
a third downstream-side portion located on a downstream side in the rotation direction,
a direction parallel to a third upstream-side line passing through the rotation center and a boundary between the third main body and the third upstream-side portion in the plane is defined as a third upstream-side radial direction, and the electric motor satisfies TFR>TBR,
where TFR is a maximum length of the third upstream-side portion in the third upstream-side radial direction in the plane.

3. The electric motor according to claim 2, wherein
a direction parallel to a third downstream-side line passing through the rotation center and a boundary between the third main body and the third downstream-side portion in the plane is defined as a third downstream-side radial direction, and
the electric motor satisfies TFR>TFL,
where TFL is a maximum length of the third downstream-side portion in the third downstream-side radial direction in the plane.

4. The electric motor according to claim 2, wherein
the three-phase coils are composed of windings each having a diameter of D1,
a direction parallel to a third downstream-side line passing through the rotation center and a boundary between the third main body and the third downstream-side portion in the plane is defined as a third downstream-side radial direction, and
the electric motor satisfies (TFR−TFL)≥D1,
where TFL is a maximum length of the third downstream-side portion in the third downstream-side radial direction in the plane.

5. The electric motor according to claim 1, wherein
an upstream-side tooth, of the three teeth, located on an upstream side in the rotation direction includes:
a third main body extending from the annular core back toward the rotor; and
a third tooth end portion located in an end portion of the upstream-side tooth and extending in the circumferential direction,
the third tooth end portion includes:
a third upstream-side portion located on an upstream side in the rotation direction; and
a third downstream-side portion located on a downstream side in the rotation direction,
a direction parallel to a third upstream-side line passing through the rotation center and a boundary between the third main body and the third upstream-side portion in the plane is defined as a third upstream-side radial direction, and
the electric motor satisfies TCR>TFR>TBR,
where TFR is a maximum length of the third upstream-side portion in the third upstream-side radial direction in the plane.

6. The electric motor according to claim 5, wherein
a direction parallel to a third downstream-side line passing through the rotation center and a boundary between the third main body and the third downstream-side portion in the plane is defined as a third downstream-side radial direction, and
the electric motor satisfies TFR>TFL,
where TFL is a maximum length of the third downstream-side portion in the third downstream-side radial direction in the plane.

7. The electric motor according to claim 5, wherein
the three-phase coils are composed of windings each having a diameter of D1,
a direction parallel to a third downstream-side line passing through the rotation center and a boundary between the third main body and the third downstream-side portion in the plane is defined as a third downstream-side radial direction, and
the electric motor satisfies (TFR−TFL)≥D1,
where TFL is a maximum length of the third downstream-side portion in the third downstream-side radial direction in the plane.

8. The electric motor according to claim 1,
wherein
a direction parallel to a first downstream-side line passing through the rotation center and a boundary between the first main body and the first downstream-side portion in the plane is defined as a first downstream-side radial direction, and
the electric motor satisfies TCR>TCL,
where TCL is a maximum length of the first downstream-side portion in the first downstream-side radial direction in the plane.

9. The electric motor according to claim 1,
wherein
a direction parallel to a second downstream-side line passing through the rotation center and a boundary between the second main body and the second downstream-side portion in the plane is defined as a second downstream-side radial direction, and
the electric motor satisfies TBR>TBL,
where TBL is a maximum length of the second downstream-side portion in the second downstream-side radial direction in the plane.

10. The electric motor according to claim 1,
wherein
the three-phase coils are composed of windings each having a diameter of D1,
a direction parallel to a first downstream-side line passing through the rotation center and a boundary between the first main body and the first downstream-side portion in the plane is defined as a first downstream-side radial direction, and
the electric motor satisfies (TCR−TCL)≥D1,
where TCL is a maximum length of the first downstream-side portion in the first downstream-side radial direction in the plane.

11. The electric motor according to claim 1,
wherein
the three-phase coils are composed of windings each having a diameter of D1,
a direction parallel to a second downstream-side line passing through the rotation center and a boundary between the second main body and the second downstream-side portion in the plane is defined as a second downstream-side radial direction, and
the electric motor satisfies (TBR−TBL)≥D1,
where TBL is a maximum length of the second downstream-side portion in the second downstream-side radial direction in the plane.

12. The electric motor according to claim 1, wherein
an upstream-side tooth, of the three teeth, located on an upstream side in the rotation direction includes:
a third main body extending from the annular core back toward the rotor; and
a third tooth end portion located in an end portion of the upstream-side tooth and extending in the circumferential direction,
the third tooth end portion includes:
a third upstream-side portion located on an upstream side in the rotation direction; and
a third downstream-side portion located on a downstream side in the rotation direction,
a direction parallel to a first downstream-side line passing through the rotation center and a boundary between the first main body and the first downstream-side portion in the plane is defined as a first downstream-side radial direction, a direction parallel to a second downstream-side line passing through the rotation center and a boundary between the second main body and the second downstream-side portion in the plane is defined as a second downstream-side radial direction, a direction parallel to a third downstream-side line passing through the rotation center and a boundary between the third main body and the third downstream-side portion in the plane is defined as a third downstream-side radial direction, and the electric motor satisfies TFL>TBL>TCL, where TCL is a maximum length of the first downstream-side portion in the first downstream-side radial direction in the plane, TBL is a maximum length of the second downstream-side portion in the second downstream-side radial direction in the plane, and TFL is a maximum length of the third downstream-side portion in the third downstream-side radial direction in the plane.

13. The electric motor according to claim 12, wherein the electric motor satisfies TCR>TFR>TBR>TFL>TBL>TCL.

14. The electric motor according to claim 1, wherein the three teeth have line symmetry about a center line passing through center of the center tooth in a radial direction in the plane.

15. A fan comprising:
a blade; and
the electric motor according to claim 1 to drive the blade.

16. An air conditioner comprising:
an indoor unit; and
an outdoor unit connected to the indoor unit, wherein
the indoor unit, the outdoor unit, or both the indoor unit and the outdoor unit include the electric motor according to claim 1.

* * * * *